US006437943B1

(12) United States Patent
Yokote et al.

(10) Patent No.: US 6,437,943 B1
(45) Date of Patent: Aug. 20, 2002

(54) SILICON CARBIDE SUBSTRATE FOR FORMING MAGNETIC HEAD

(75) Inventors: Hiroyuki Yokote; Tatsuya Kimura, both of Sendai (JP)

(73) Assignee: Kyocera Corporation, Kyoto (JP)

( * ) Notice: Subject to any disclaimer, the term of this patent is extended or adjusted under 35 U.S.C. 154(b) by 63 days.

(21) Appl. No.: 09/637,420

(22) Filed: Aug. 11, 2000

(30) Foreign Application Priority Data

Aug. 11, 1999 (JP) ........................................ 11-227957

(51) Int. Cl.[7] ........................................ G11B 5/60
(52) U.S. Cl. ........................................ 360/235.3
(58) Field of Search ........................ 360/235.1–235.3, 360/126

(56) References Cited

U.S. PATENT DOCUMENTS 4,859,638 A * 8/1989 Wada ........................ 501/58
6,001,756 A * 12/1999 Takahashi .................. 501/90

* cited by examiner

*Primary Examiner*—A. J. Heinz
(74) *Attorney, Agent, or Firm*—Hogan & Hartson, LLP

(57) ABSTRACT

To provide a magnetic-head substrate capable of improving the heat radiation characteristic while keeping a mechanical strength and a milling characteristic equal to those of a conventional $Al_2O_3$-TiC system and preventing an device from contacting a medium face and moreover superior in film contact strength, electrical withstand voltage, and face quality. The magnetic-head substrate is constituted of a sintered body containing 99 wt % or more of silicon carbide and 0.3 wt % or less of free carbon and having a relative density of 99% or more.

13 Claims, 1 Drawing Sheet

1
7
5
2
6

SILICON CARBIDE SUBSTRATE FOR FORMING MAGNETIC HEAD

BACKGROUND OF THE INVENTION

1. Field of the Invention

The present invention relates to a magnetic head used for a magnetic storage device, and to a substrate for fabricating a magnetic head thereon.

2. Description of the Related Art

Various record/reproduce magnetic heads for a high capacity storage medium are used to record images in 8-mm video tape recorders or electronic still cameras and to record data in general hard disks or video or digital-audio flexible disks. Recently, a packing density in magnetic-recording devices has been rapidly improved and thin-film magnetic heads using a thin film magnetic device such as MR device are used instead of conventional ferrite core magnetic heads.

Slider material for the thin-film magnetic heads is required high wear resistance, surface smoothness on the air bearing surface, and also high machinability and milling characteristics including ion milling and reactive ion etching (RIE). To meet the above requirements, alumina-titanium-carbide-based ceramics is used to form the slider material.

Today, technologies of magnetoresistive (MR) or giant magnetoresistive (GMR) sensing devices using magnetoresistive effect have been introduced into magnetic head devices to improve packing density of the storage systems. On one hand, to improve read-sensitivity of MR devices, the sensing current must be increased from MR devices. On the other hand, to improve the recording density on the storage media, it is necessary to reduce a magnetized volume in the medium on a magnetic disk. In the case of the MR head slider for hard disk drive, a levitation of the head slider reaches approximately 1 $\mu$m from the storage surface of the disk, which is close to a near-contact, and then a temperature of the MR device tends to vary due to the degree of near contact with the medium during sliding.

With decrease in magnetized volumes of a medium, the magnetizing direction of a pin layer becomes more unstable resulting in deteriorated head performance. This thermal asperity phenomenon also has been a important problem and heat radiation characteristic around an magnetic device mounted on the magnetic head must be improved.

To improve heat radiation characteristic around a magnetic device, a gap layer has been formed of AlN or DLC having a high thermal conductivity. An amorphous alumina on an $Al_2O_3$-TiC-based substrate has been decreased in thickness. These solutions allow an MR device to approach an $Al_2O_3$-TiC substrate, having an effect for improving heat radiation from the devices. Moreover, many recesses occurring due to a hardness difference between an $Al_2O_3$-TiC substrate and an alumina layer can prevent an MR device from colliding to a medium face. Also, heat radiation characteristic has been improved by interposing a DLC layer having a high thermal conductivity between an amorphous alumina layer and an $Al_2O_3$-TiC-based substrate.

However, because it is not enough only to improve the heat radiation characteristic around an device, a high heat radiation characteristic is requested for a substrate. A conventional $Al_2O_3$-TiC-based substrate material has a low thermal conductivity of approximately 25 W/m.K, obtaining an insufficient heat radiation characteristic as the whole of a magnetic head even though a high-thermal conductivity layer is formed on such a substrate.

Therefore, as an attempt of applying a silicon carbide sintered body having a high thermal conductivity to a magnetic recording part because a substrate material has a preferable heat radiation characteristic, a sintered body added with a sintering agent is disclosed in Japanese Patent Publication No. 63-128885/1988. Moreover, Japanese Patent Publication No. 5-258241/1993 discloses a slider of a magnet head formed on a sintered body containing a combined phase of an SiC-Al-O-N phase and a TiN/TiC phase. Also, Japanese Patent Publication No. 10-251086/1998 discloses a silicon carbide reaction-sintered body impregnated with silicon (Si) being used as a slider.

Magnetic heads are generally fabricated as described below. First, a substrate having a diameter of 3 in. to 6 in. is provided with an insulating underlayer by alumina sputtering on its body surface. Thousands of magnetic devices such as MR devices are formed on the insulating film using a lithography technique, and then, another insulating alumina layer is covered over the devices over the surface of the substrate. The Substrate is cut to separate bars each including a plurality of the magnetic devices, considering a polishing margin for sliders. The bar is precisely mirror-machined on one of cut-out faces to form an air bearing surface and grooved through ion milling or reactive ion etching (RIE) at a high accuracy to form a negative pressure portion on the air bearing surface, and thereafter is divided to each magnetic head.

However, because the silicon carbide sintered body in which silicon is impregnated disclosed in Japanese Patent Publication No. 10-251086/1998 is a mixture of silicon and silicon carbide grains, these two phases are different in hardness, and different in lapping rate or ion-milling rate during mirror machining in the negative-pressure portion, causing steps on surfaces of the substrate to occur easily after machining, therefore, the sintered body not being practically used.

Moreover, known silicon carbide sinters use a sintering agent such as alumina or yttria, as disclosed in Japanese Patent Publication No. 63-128885/1988. A grain-boundary phase of the sintered body contains a composite oxide as a reaction product of an agent and silica in silicon carbide grains, and therefore the differences of hardness and milling characteristics between the grain-boundary phase and the silicon carbide grain roughen the polished surfaces of the sintered body.

Moreover, silicon carbide sintered bodies often contain boron or carbon as a sintering agent, but more carbon may be added as an indispensable component so that free carbon remains in the form of individual grains in the sintered body. As a result, machinabilities differ of remaining carbon grains and silicon carbide grains due to difference in hardness and chemical properties and a great number of voids are produced in the polished surface after machining.

SUMMARY OF THE INVENTION

It is an object of the present invention to provide a magnetic head slider capable of preventing voids or steps from being produced after mirror machining or ion milling, improving the precision machinability, and achieving dense and superior smoothness.

It is another object of the present invention to provide a substrate insulated from a magnetic shield, preventing an device from contacting a medium face, and having an amorphous insulating layer superior in contact strength, electrical withstand voltage, and face quality.

The present invention is realized as a result of studying various materials having a thermal conductivity and a volume resistivity necessary for a magnetic-head substrate and a magnetic head and moreover having preferably strength and sliding characteristic, and thereby knowing that the above object can be achieved by controlling the purity, denseness, and other characteristics of silicon (Si) carbide in a specific range.

A magnetic-head substrate of the present invention is made of ceramics containing 99 wt % of silicon carbide or more and 0.3 wt % of free carbon or less, and having a relative density of 99% or more.

Moreover, a magnetic head of the present invention is constituted by forming alumina, AIN, or BN serving as an insulating underlayer on a magnetic-head substrate of the present invention.

DESCRIPTION OF THE PREFERRED EMBODIMENTS

Figure 1:
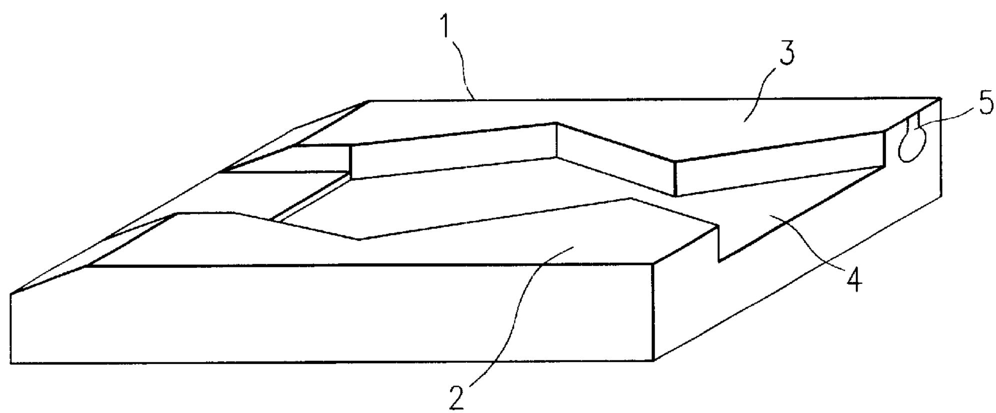
FIG. 1 is a perspective view of a magnetic-head slider manufactured by using a magnetic-head substrate of the present invention.

A magnetic-head substrate of the present invention uses a high-purity silicon carbide sintered body containing 99% or more by weight of silicon carbide and 0.3% or less by weight of free carbon. A relative density, that is, a ratio of a real-measured density of silicon carbide to a theoretical density (3.21 g/cm$^3$) of silicon carbide is specified to 99% or more, preferably 99.5% or more. In the case of the above sintered body, a face machined through ion milling or RIE used for machining an air bearing surface of a magnetic-head slider by irradiation with ions is smooth. The sintered body stabilizes a levitation distance of a head and head characteristics and is preferably as a magnetic head.

It is possible to decrease the surface roughness (Ra) of the silicon carbide sintered body to 20Å or less through mirror machining when measured by an atomic force microscope (AFM). It is preferable to mirror-finish the thin-film-device forming surface of a magnetic-head substrate. Because the substrate is substantially made of a single-phase high-purity silicon carbide sintered body, the surface of the substrate is smoothed through ion milling and it is possible to decrease the surface roughness to 100Å or less when measured by AFM.

In the case of a silicon carbide sintered body having a relative density of 99 wt % or more, a high thermal conductivity of 100 w/m.K improve the heat radiation characteristic for heat produced by a magnetic device such as MR device, and thereby a temperature change of a medium may be prevented. This reduces the tendency of manifesting the thermal asperity phenomenon.

Because a silicon carbide sintered body of the present invention has a Young's modulus of 400 GPa or more equal to that of a conventional $Al_2O_3$-TiC-based substrate, it is superior in rigidity under and after machining. Preferably, the mean crystal-grain size of a sintered body may be controlled to 10.0 $\mu$m or less. In this case, breakage of the bars due to increase in strength when cutting from a substrate can be prevented and the smoothness can be improved on the surface after milling.

It is preferable that the silicon carbide sintered body has a volume resistivity at a room temperature in a range of $10^9$ to $10^6$ Ω. cm and n this case, it is most suitable as a magnetic-head substrate.

Moreover, The silicon carbide sintered body may contain boron carbide in a range of 0.1 to 0.4 wt % as a sintering agent.

Furthermore, an amorphous layer is formed on a magnetic-head substrate of the present invention up to a thickness of 3 to 20 $\mu$m through sputtering as an insulating underlayer between magnetic shields. It is also permitted to use a amorphous double layer as the insulating underlayer. For example, the double layer may include a first amorphous alumina layer having a thickness of 0.2 to 2.4 $\mu$m formed through sputtering and a second amorphous alumina layer having a thickness of 10Å to 0.55 $\mu$m formed through ECR sputtering, these layers laminated in this order or inverse order on a substrate.

The insulating underlayer has advantage of remarkably improving the heat radiation characteristic of a magnetic-head device section together with s silicon carbide substrate material and moreover, prevent the device from contacting a medium face, and provide a magnetic-head substrate superior in film contact strength, electrical withstand voltage, and face quality.

Figure 2:
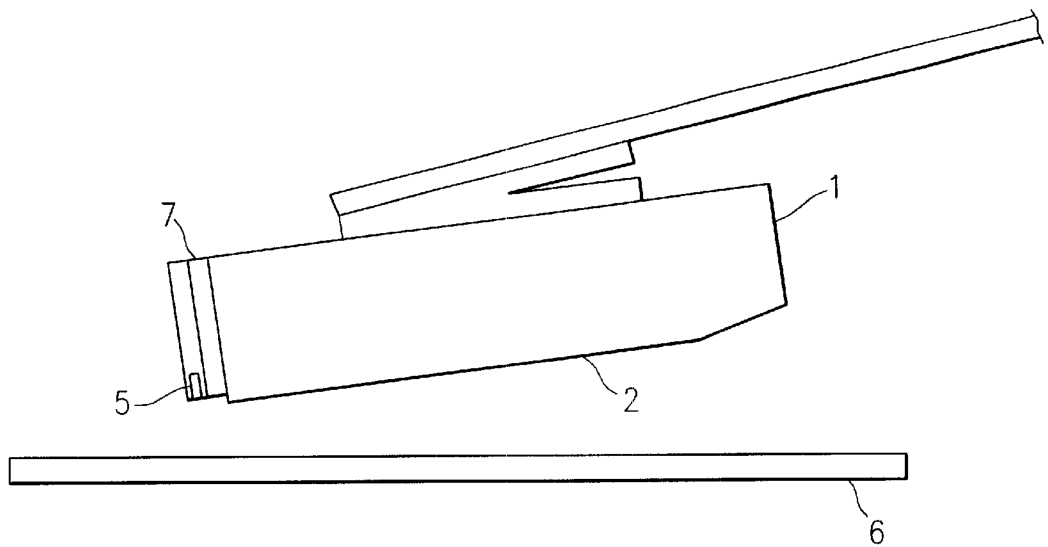
FIG. 2 is an illustration showing an operating state of the magnetic head in FIG. 1.

FIG. 1 shows a magnetic head fabricated from a magnetic-head substrate of the present invention. In the magnetic head, a slider 1 constituted of a magnetic-head substrate of the present invention is provided with an levitation face 2 having an air bearing surface 3 and a step portion 4, and a magnetic device 5 is set to an end side of the slider 1. As shown in FIG. 2, the magnetic device 5 is set to the slider 1 through an insulating underlayer 7. When the device 5 operates, it is slider-levitated above a medium 6 by an air flow to perform magnetic recording and reproducing between the device 5 and the surface of the medium 6.

To fabricate the above magnetic head, the insulating underlayer 7 is formed on the surface of a magnetic-head substrate having a diameter of 3 in. to 6 in. and then, thousands of magnetic devices 5 are formed on the insulating underlayer 7 through lithography. Moreover, an insulating alumina layer is formed on the device 5. Then, by considering a polishing margin of a slider, a bar including a plurality of magnetic heads is cut out. The bar is precisely mirror-machined by using one of the bar cut-out faces as an air bearing surface (levitation face 2) and thereafter, accurately grooved through ion milling or reactive ion etching (RIE) to form a step portion 4 having a depth of 1 $\mu$m or less serving as a negative-pressure portion. Then, each magnetic head is cut out.

The surface of a silicon carbide sintered body of the present invention can be formed into a very smooth face through mirror polishing, ion milling, or RIE and the air bearing surface (levitation face 2) can be formed into a roughness of 7 Å or less when measured by an atomic force microscope (AFM). Similarly, the step portion can be formed into a roughness of 100 Å or less.

To manufacture a silicon carbide sintered body of the present invention, it is possible to use normal-pressure sintering, hot pressing, and CVD. Hot pressing and CVD make it possible to manufacture a densified substrate and the thermal conductivity is comparatively high. However, as disclosed in Japanese Patent Publication No. 5-330917/1993, a sintered body according to normal sintering has a low thermal conductivity of 60 to 80 W/m.K and it is difficult to completely densify the sintered body. Therefore, it is known to densify a sintered body and effectively improve the thermal conductivity by applying heat treatment to the body in a high-pressure inert gas 1,700 to 2,000° C.

EMBODIMENTS

Embodiment 1

Silicon carbide powder was used which was synthesized in accordance with the Acheson's method, contained 2 wt % of free silica, and 0.3 wt % of free carbon, and had a mean crystal grain size of 0.5 μm. Boron-carbide powder having a mean crystal grain size of 0.8 μm was blended with the silicon carbide powder at various ratios and mixed in a polyethylene vessel with a ball mill by using a polyimide ball. An organic solvent in which a phenol resin having a carbonization rate of 40% was dissolved was added to the mixed powder, then the organic solvent was removed and granulated. The granulated matter was crammed into a carbon mold and hot-press-baked for 1 hr in an argon atmosphere while being pressured at 30 Mpa to obtain a sintered body having a diameter of 40 mm.

The obtained sintered body was mirror-polished and the density of the sintered body was measured through the Archimedes' method to obtain a relative density by assuming the theoretical density as 3.20 g/cm$^3$. The quantity of free carbon was measured in accordance with JIS R1616. A sample was etched in an NaOH-$KNO_3$ solution and the mean diameter of silicon carbide crystal grains was measured by the coding method.

A sample according to JIS C2141 was cut out from the sintered body to measure the thermal conductivity, Young's modulus, and volume resistivity.

Moreover, the mirror-finished-surface roughness (Ra) of the obtained sample was measured by an atomic force microscope (AFM). A sample cut out into a bar from a mirror-finished-surface substrate and precisely mirror-machined was held by a mask in a vacuum state of $5.2 \times 10^{-4}$ Torr and then, the surface of a head step portion was machined up to a depth of 0.6 μm by an argon beam of 300V and 20.0 mA. The roughness (Ra) of the machined surface was measured by an AFM. Table 1 shows the results as sample Nos. 1 to 6.

For comparison, a sintered body was manufactured by using α-type silicon carbide having a mean crystal grain size of 1.5 μm and containing 1.5 wt % of free silicon and 0.2 wt % of free carbon and the same test was performed. Table 1 shows the result as sample No. 7.

Moreover, the α-silicon carbide powder was mixed with β-silicon carbide powder having an mean crystal grain size of 0.5 μm and containing a 0.6 wt % of free silica and 1.3 wt % of free carbon at various rates. Boron-carbide powder having an mean crystal grain size of 0.8 μm was blended with silicon carbide powder at a rate of 0.4 wt % to the total amount of the silicon carbide powder and then dried and granulated similarly to the case of the previous embodiment. The granulated powder was crammed into a carbon mold. Then, a pressure of 30 MPa was applied to the granulated powder at various temperatures to hot-press-bake the powder. The obtained sintered body was similarly tested. Tables 1 and 2 show the results as samples 8 to 13.

TABLE 1

| Sample No. | Sic (wt. %) | free carbon (wt. %) | Relat. density (%) | SiC grain size (μm) | Heat conductivity (W/mk) | Young's modulus (Gpa) | Volume resist. (Ω·cm) |
|---|---|---|---|---|---|---|---|
| *1 | 95.0 | 4.0 | 97.0 | 1.5 | 95 | 340 | $10^3$ |
| *2 | 98.0 | 0.5 | 98.5 | 2.0 | 125 | 380 | $10^6$ |
| 3 | 99.0 | 0.3 | 99.2 | 3.0 | 135 | 430 | $10^6$ |
| 4 | 99.5 | 0.1 | 100.0 | 4.0 | 140 | 460 | $10^6$ |
| *5 | 99.0 | 0.4 | 98.7 | 2.0 | 125 | 440 | $10^6$ |

TABLE 1-continued

| Sample No. | Sic (wt. %) | free carbon (wt. %) | Relat. density (%) | SiC grain size (μm) | Heat conductivity (W/mk) | Young's modulus (Gpa) | Volume resist. (Ω·cm) |
|---|---|---|---|---|---|---|---|
| 6 | 99.5 | 0.2 | 99.9 | 4.0 | 130 | 460 | $10^6$ |
| *7 | 99.5 | 0.2 | 100.0 | 15.0 | 140 | 460 | $10^6$ |
| *8 | 95.0 | 4.0 | 98.0 | 3.0 | 80 | 330 | $10^4$ |
| *9 | 98.0 | 0.5 | 98.0 | 4.0 | 110 | 400 | $10^9$ |
| 10 | 99.0 | 0.3 | 99.5 | 8.0 | 135 | 460 | $10^9$ |
| *11 | 99.5 | 0.1 | 72.5 | 1.0 | 80 | 320 | $10^{10}$ |
| 12 | 99.5 | 0.1 | 99.5 | 7.0 | 135 | 460 | $10^9$ |
| *13 | 99.5 | 0.1 | 100.0 | 14.0 | 135 | 460 | $10^9$ |

TABLE 2

| Sample No. | Substrate surface Ra (Å) mirror-machined | Step portion Ra (Å) milled | Head sliding surface Ra (Å) |
|---|---|---|---|
| *1 | 21 | 210 | 19 |
| *2 | 16 | 160 | 9 |
| 3 | 11 | 60 | 4 |
| 4 | 9 | 45 | 4 |
| *5 | 18 | 150 | 12 |
| 6 | 12 | 50 | 5 |
| *7 | 11 | 130 | 9 |
| *8 | 15 | 230 | 10 |
| *9 | 22 | 180 | 11 |
| 10 | 10 | 100 | 6 |
| *11 | 45 | 330 | 30 |
| 12 | 11 | 75 | 7 |
| *13 | 9 | 145 | 10 |

According to Table 1, when a relative density is lower than 99%, a thermal conductivity tens to extremely lower and a sufficient heat-radiation characteristic is not obtained. Moreover, a superior mirror machinability is not obtained but the roughness of a substrate surface after mirror machined increases. When voids remain in a substrate, a relative density lowers. Remaining of voids deteriorates the mirror machinability of a silicon carbide material and face degrees of a step portion after ion milling can be larger than 100 Å. When the roughness of a levitation dynamic-pressure section exceeds 100 Å, the levitation characteristic becomes unstable and a stable head characteristic is not obtained.

Moreover, it is known that, when sintering silicon carbide, additive carbon and free carbon react with free silica contained in silicon carbide powder to produce silicon carbide and the reaction improves the sintering characteristic. However, remaining of unreacted free carbon after sintering lowers a relative density to silicon carbide according to stoichiometric composition. While ion milling or RIE is performed when a head is machined, free carbon is preferentially milled because the milling rate is different from that of silicon carbide. As a result, a step or elevation occurs on the surface of the free carbon and the face roughness of the free carbon after milling increases. Moreover, the free carbon tends to lower the thermal conductivity.

When the quantity of free carbon increases, the resistance lowers due to the conductivity of the carbon. To manufacture a head, it is preferable that a material is almost semiconductive, that is, the material has a volume resistivity of $10^6$ to $10^9$ Ω. cm. For conductivity, the purity of a silicon carbide material is also an important factor. When the purity is low, impurity lowers the conductivity and thereby, it is difficult to obtain sufficient conductivity and ion-milling characteristic.

Sample No. 7 is kept in preferable ranges in purity, carbon quantity, and relative density. However, the crystal grain size is large and thereby, the face roughness of a head step portion after milled is made to increase. This is caused by remaining of uneven portions due to milling because the depth of the step portion is 1 μm that is very small to the crystal grain size. Therefore, a small crystal grain size is preferable. A means crystal grain size of 10.0 μm or less is preferable and that of 4.0 μm or less is more preferable.

Every sample of the present invention contained 99 wt % of silicon carbide or more and 0.3 wt % of free carbon or less and had a thermal conductivity of 100 W/mK or more, a Young's modulus of 400 GPa or more, a means crystal grain size of 10.0 μm or less, and a volume resistivity of $10^6$ to $10^9$ Ω. cm.

Moreover, these samples had a face roughness (Ra) of 20 Å after mirror machine, the head step portion had a face roughness (Ra) of 100 Å of less after ion milled, and the head-sliding portion had a face roughness of 7 Å or less.

Embodiment 2

An amorphous alumina layer was formed on a substrate (surface roughness Ra of 9 Å) of sample No. 4 of Embodiment 1 through sputtering by using a alumina having a purity of 99.5% as a target. Thereafter, the substrate was mirror-machined with a polishing solution obtained by suspending spherical-alumina impalpable powder in demineralized water. Finally, the substrate was precision-machined with a polishing solution obtained by suspending spherical-ceria impalpable powder in demineralized water to produce an amorphous alumina layer having a surface roughness (Ra) of 3 Å and a thickness of 1 to 25 μm.

Film separation after heat treatment and ordinary-temperature resistance if these 3 samples were measured and the result thereof are shown in Table 4.

For film separation after heat treatment, separation at the stage of film formation was observed by a differential interference microscope (at a magnification of 50) by heating each sample in a vacuum atmosphere at a temperature of 600° C.

For ordinary-temperature resistance, Ti/Au electrodes (diameter of 4 microinchs) was formed on the film surface at 20 places and 10 V was applied to the surface at ordinary temperature by using the three-terminal method to obtain the minimum resistance by measuring the resistance between the film surface and the back of the substrate.

TABLE 3

| Sample No. | Amorphous alumina thickness (μm) | Film separate | Resistance (Ω) |
|---|---|---|---|
| *1 | 1 | no | $10^8$ |
| 2 | 3 | no | $10^{11}$ |
| 3 | 5 | no | $10^{11}$ |
| 4 | 10 | no | $10^{12}$ |
| 5 | 15 | No | $10^{12}$ |
| 6 | 20 | no | $10^{12}$ |
| *7 | 25 | yes | $10^{13}$ |

As clarified from the results shown in Table 3, in the case of sample Nos. 2 to 7 of the present invention, a resistance of $10^{11}$ Ω or more is obtained by setting the thickness of the amorphous alumina film to 3 μm or more and a superior withstand voltage is obtained. However, when the film thickness exceeds 20 μm, film separation occurs after heat treatment because the stress in a film under sputtering is high. Therefore, it is preferable that an amorphous alumina film has a thickness of 3 to 20 μm.

Moreover, the same characteristic can be obtained even by setting the thickness of AIN or BN serving as an insulating underlayer in a range of 3 to 20 μm.

Embodiment 3

An amorphous alumina layer was formed through sputtering by using the substrate of sample No. 4 of Embodiment 1 having a surface roughness of 9 Å and using alumina having a purity of 99.5% as a target as shown in Table 3. Thereafter, the substrate was mirror-machined with a polishing solution obtained by suspending spherical-alumina impalpable powder in demineralized water and then finally precision-machined with a polishing solution obtained by suspending spherical-ceria impalpable powder in demineralized water to form first amorphous alumina layers having a thickness of 1 to 2 μm and a surface roughness (Ra) of 3 Å as sample Nos. 1 to 7.

Thereafter, as shown in Table 3, second amorphous alumina layers having various thicknesses were formed through ECR sputtering. Moreover, a case of forming an amorphous alumina layer through normal sputtering instead of the second amorphous alumina layers is shown as sample No. 1.

Layer separation, resistance, and surface roughness after heat treatment were measured and evaluated similarly to the case of Embodiment 2.

TABLE 4

| Sample No. | Thick. of, 1st amorphous alumina layer (μm) | Second amorphous alumina layer: Forming method | Second amorphous alumina layer: Mirror surface | Film separation heat treat. | Resistivity Ω | Surface rough. Ra (Å) |
|---|---|---|---|---|---|---|
| *1 | 2 | Sputter (0.3 μm) | Yes | No | $10^9$ | 3 |
| 2 | 2 | ECR (0.5 μm) | No | No | $10^{13}$ | 5 |
| 3 | 2 | ECR (0.15 μm) | Yes | No | $10^{12}$ | 3 |
| 4 | 2 | ECR (0.01 μm) | NO | No | $10^{11}$ | 4 |
| 5 | 1 | ECR (0.15 μm) | Yes | No | $10^{12}$ | 3 |
| 6 | 1 | ECR (50Å) | No | No | $10^{11}$ | 4 |
| *7 | 1 | ECR (0.6 μm) | No | Yes | $10^{12}$ | 6 |

In the case of samples 2 to 6 of the present invention, even by setting the thickness of an amorphous alumina layers to 2.5 μm or less, the resistance reached $10^{11}$ Ω or more and a superior withstand voltage was obtained and moreover, film separation did not occur after heat treatment and the surface roughness Ra was 5 Å or less.

When forming an amorphous alumina layer through ECR sputtering, the surface roughness tended to increase, but a very-high-density of the layer and a very smoothness of the surface with a roughness Ra of less than 10 Å were obtained. Moreover, by CMP-machining the layer of so high density, a more-smooth face can be obtained. Furthermore, in the case of sample No. 7, when forming the second amorphous alumina layer at a thickness of 0.6 μm through ECR sputtering, film separation occurred through heat treatment in a vacuum state because a stress due to the density difference between two layers is too high.

Moreover, characteristics are not lost even if normally rotating (sic) the order of forming a first amorphous layer according to sputtering and a second amorphous layer according to ECR sputtering.

Furthermore, same characteristics can be obtained from the first and second amorphous layers even by using AIN or BN.

As described above, the present invention makes it possible to provide a magnetic-head substrate capable of obtaining a preferable head characteristic of a magnetic head in various material characteristics by controlling the relative density and crystal grain size of a high-purity silicon carbide sintered body, insulating a silicon carbide substrate from a magnetic shielding layer by forming an insulating underlayer on the substrate and remarkably improving heat radiation characteristics of a silicon carbide substrate material and a magnetic-head device portion, and moreover preventing an device from contacting a medium face, and furthermore superior in mirror-machinability and milling characteristics.

What is claimed is:

1. A substrate for magnetic head use comprising a sintered body which contains silicon carbide in an amount of 99% or more by weight and free carbon in an amount of not more than 0.3%, and wherein the sintered body has a relative density of 99% or more.

2. The substrate according to claim 1, wherein the sintered body has a thermal conductivity of 100 W/m.K or more at room temperature, a Young's modulus of 400 GPa or more at room temperature, a mean crystal grain size of 10.0 $\mu$m or less, and a volume resistivity of $10^9$ to $10^6$ Ω.cm at room temperature.

3. The substrate according to claim 1, wherein the sintered body further includes boron carbide in the range of about 0.1% to about 0.4% by weight.

4. A substrate for magnetic head use comprising:

a sintered body which contains silicon carbide in an amount of 99% or more by weight and free carbon in an amount of not more than about 0.3% by weight, wherein the sintered body has a relative density of 99% or more, and wherein the substrate includes a surface for forming a thin-film magnetic device, the surface having the roughness (Ra) of 20 Å or less when measured by an atomic force microscope.

5. The substrate according to claim 4, wherein the substrate includes an insulating underlayer comprising a laminate of a first amorphous layer formed of alumina, aluminum nitride or boron nitride, through sputtering with a thickness of 0.2 $\mu$m to 2.4 $\mu$m, on said surface on the substrate, and a second amorphous layer made of alumina, aluminum nitride or boron nitride formed through ECR sputtering, with a thickness of 10 Å to 5500 Å on the first layer.

6. The substrate according to claim 4, wherein the substrate includes an insulating underlayer which is an amorphous layer formed of alumina, aluminum nitride or boron nitride on said surface on the substrate by sputtering and which has a thickness of 3 to 20 $\mu$m.

7. The substrate according to claim 4, wherein the sintered body has a thermal conductivity of 100 W/m.K or more at room temperature, a Young's modulus of 400 GPa or more at room temperature, a mean crystal grain size of 10.0 $\mu$m or less, and a volume resistivity of $10^9$ to $10^6$ Ω.cm at room temperature.

8. The substrate according to claim 4, wherein the sintered body further includes boron carbide in the range of about 0.1% to about 0.4% by weight.

9. The substrate according to claim 4, wherein the mean crystal grain size of the sintered body is 10.0 $\mu$m or less.

10. A magnetic head comprises:

a substrate, wherein the substrate comprising a sintered body which contains silicon carbide in an amount of 99% or more by weight and free carbon in an amount of not more than about 0.3% by weight, and wherein the sintered body has a relative density of 99% or more, and wherein the substrate forms an air bearing surface having a surface roughness (Ra) of 7 Å or less when measured by an atomic force microscope; and a step portion for causing dynamic levitating pressure having a depth of 1 $\mu$m or less and provided nearby the air bearing surface, the step portion having a surface roughness (Ra) of 100 Å or less when measured by an atomic force microscope.

11. The magnetic head according to claim 10, wherein the sintered body further includes boron carbide in the range of about 0.1% to about 0.4% by weight.

12. The magnetic head according to claim 10, wherein the mean crystal grain size of the sintered body is 10.0 $\mu$m or less.

13. The magnetic head according to claim 10, wherein the sintered body has a thermal conductivity of 100 W/m.K or more at room temperature, a Young's modulus of 400 GPa or more at room temperature, a mean crystal grain size of 10.0 $\mu$m or less, and a volume resistivity of $10^9$ to $10^6$ Ω. cm at room temperature.

* * * * *